Feb. 8, 1944.   B. SONNTAG   2,341,245
KITCHEN AIR CLEANER AND PURIFIER
Filed June 12, 1941
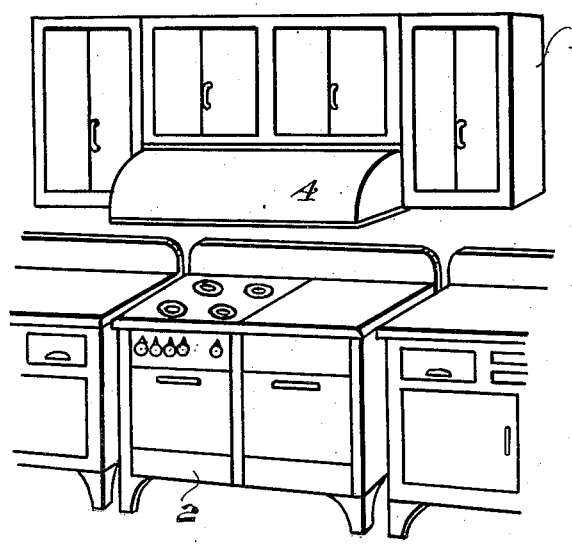
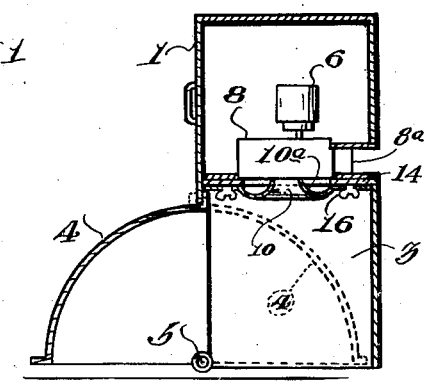
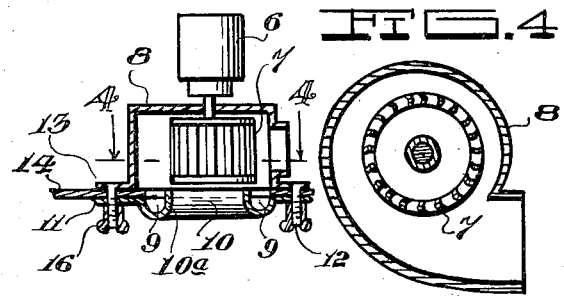
Bernhard Sonntag
INVENTOR.
John M. Spellman
ATTORNEY.

Patented Feb. 8, 1944

2,341,245

UNITED STATES PATENT OFFICE 2,341,245

KITCHEN AIR CLEANER AND PURIFIER

Bernhard Sonntag, Dallas, Tex.

Application June 12, 1941, Serial No. 397,719

6 Claims. (Cl. 98—115)

This invention relates to kitchen air-cleaners and purifiers of a type described and claimed in applicant's U. S. Patent No. 2,077,496, the present invention being also related to applicant's Design Patents Nos. 113,051 and 118,421.

Generally to object of the invention is the provision of an apparatus whereby the heated air, laden with foreign material, which rises by convection above a kitchen stove or gas range is entrapped within the confines of a hood and is subsequently purified for return to the kitchen or made to pass outwardly from the kitchen through a flue. The apparatus embodying the present invention includes also its adaptability to installation in dwellings where no flue is present thus eliminating the cost of construction of a vent.

The primary object of the present invention is to provide a kitchen air cleaner and purifier suitable to modern kitchens, where the kitchen furniture, such as the kitchen cabinet and similar commodity containers are grouped together in order to utilize space, and to place the air cleaner and purifying apparatus within one of the cabinet spaces where it is entirely concealed from view.

Another object of the invention is to provide a kitchen air cleaner and purifying apparatus including a hood for collection of the grease laden smoke and fumes from the gas range or stove, and to provide such a hood with means whereby when not in use it may be swung inside the cabinet and also entirely concealed from view.

The invention also includes an improved form of grease trap where greases from the smoke may be collected and the trap emptied and cleaned from time to time and without dismantling the other parts of the apparatus.

With the above and other objects in view the invention may be readily understood from a perusal of the following detailed description, taken in connection with the accompanying drawing, and in the drawing:

Figure 1 is a perspective view of the invention shown in its operative relationship with a kitchen gas range, Figure 2 is a view of one form of the invention shown in vertical section, Figure 3 is an elevational view of the blower and motor, and illustrating the blower housing in vertical section, Figure 4 is a view taken on the line 4—4 of Figure 3.

Referring primarily to Figures 1 and 2, the reference numeral 1 denotes a kitchen cabinet which is positioned above a range 2 as shown.

The cabinet 1 is provided with a central space 3, into which a hood 4 is arranged to be pivotally swung into inoperative position as shown by the dotted lines in Figure 2. Pivots 5 are positioned at either end of the hood 4. It will be noted that the hood 4 is of such size that when it is in the operative position best shown in Figure 1, it will substantially cover the entire range in vertically spaced relationship.

In accordance with my invention means are provided within the cabinet 1 above the space 3 for drawing smoke, fumes and grease-laden air arising from the stove into a suitable housing wherein a portion of the grease is condensed and collected in a trough-like receptacle, after which the remaining gases, air and fumes may be passed to a suitable flue or other vent.

It will be noted that the hood 4 and the lower and upper portions of the cabinet 1 together comprise means defining an offtake passageway for withdrawing grease-laden air from the space above a stove or the like and passing the same to a suitable vent or outlet, not shown. As shown in Fig. 2, a suitable partition is placed within the passageway intermediate the inlet and outlet portions thereof, the said partition having an opening therein to accommodate a suitable trough-like grease collector or trap.

Referring particularly to Figs. 2 to 4, inclusive, the reference numeral 6 denotes a fan motor located within the central portion of the cabinet 1 and adapted to drive a suitable fan or blower 7 enclosed within a scroll housing 8 which may be secured to a partition or shelf 14 separating the space 3 from the upper portion of the cabinet 1. It will be noted that the motor shaft extends through the top of the housing and the fan or blower 7 is mounted for rotation about a vertical axis. Below the partition or shelf 14 and suitably secured thereto is an annular grease collector or trap, generally designated by the reference numeral 9, which is adapted to collect the grease or the like which may be condensed within the housing 8. The shelf or partition 14 is suitably cut away to accommodate the grease trap, which trap is provided with a lateral flange 11 adapted to engage the under portion of the partition or shelf 14 adjacent the cut away portion thereof. The housing 8 is provided with a similar flange 13 engaging the upper surface of the partition, and suitable fastening means or bolts 12 extend through openings 15 in the partition. Securing means, such as butterfly nuts 16, may be employed to retain the flange 11 in place upon the bolts 13. It will be obvious that by removing the wing nuts 16 the grease trap may be readily removed from time to time for cleaning purposes. As shown, the grease trap 9 is trough-shaped and is provided with a central opening 10 provided by the vertical tubular portion 10a of the grease trap.

In operation the smoke and fumes from the range are caught under the hood and are drawn inwardly through the tubular portion 10a of the grease trap into the housing 8. Within the housing a certain amount of grease is condensed and caught in the trap 9. The fumes and smoke from which the grease has been separated are forced outwardly through an outlet 8a, the latter being connected to a flue or other vent. As has previously been stated the trap may be readily removed when it is desired to clean out the grease collected therein.

The primary object of the invention is to place the air cleaner and purifying apparatus in a concealed position within a part of the kitchen cabinet, and also to further this idea of compactness and concealment by providing a swingable hood construction which will also be out of sight or view when the gas range is not being used. Toward this latter end there is therefore provided the hood 4, described heretofore, and illustrated in Figures 1 and 2, showing the hood in an extended or operative position, and in a retracted or inoperative position as indicated by the dotted lines in Figure 2.

While the disclosure presents a practical working embodiment of the invention, it will be understood that various alterations and changes are possible apart from those shown in the drawing, which will be within the objective of the invention and which may be said to come fairly within the scope and range of the following claims.

What is claimed is:

1. A kitchen ventilator and air purifier adapted to be utilized with a kitchen cabinet having a retractable hood, said ventilator comprising a scroll housing disposed within the upper part of the cabinet and on a plane above the hood, a motor-operated blower in the scroll housing, a grease collector comprising an annular trough, a shelf interposed between the grease collector and the scroll housing, said shelf having an opening therethrough, said shelf providing a support for the grease collector and the scroll housing, said grease collector having a central tubular member passing through and spaced from the edges of the opening in the shelf and communicating with the scroll housing for flow of smoke and fumes from a cooking range, and said scroll housing including an outlet for said fumes to a flue.

2. In a kitchen ventilator, means defining an offtake passage for withdrawing grease-laden fumes from a stove or the like, a horizontal partition within the passageway between the upper and lower ends and having an opening therein, a fan casing secured to said partition above the same, said casing having an inlet communicating with said opening and a discharge outlet, a fan within said casing for drawing grease-laden air through said inlet and discharging air through said outlet after removal of grease, and a grease trap secured below said partition, comprising an annular trough for collecting grease condensed within said casing and having a central tubular passage through which grease-laden air is drawn, said tubular passage extending through and being spaced from the edges of the opening in the shelf whereby grease collecting on the walls of the scroll housing will be deposited into the annular cavity of the grease trap.

3. A kitchen ventilator having a passageway communicating at its lower end with the space above a kitchen stove, and discharging at its upper end into a suitable vent, a horizontal partition intermediate the ends of the passageway and having an opening therein, means for producing a forced draft through the passageway comprising a scroll shaped fan casing secured to said partition above the same, said casing having a central bottom inlet communicating with the opening in said partion and a lateral outlet above the partition, a fan mounted to rotate about a vertical axis within said casing, and a grease trap secured to the under side of the partition, comprising an annular trough having a central tubular passage extending through and spaced from the edges of the opening in said partition, through which passage grease-laden air is drawn into the fan casing, said fan casing serving to condense the grease vapors from the air and deposit the condensate within the trough.

4. A kitchen ventilator and air purifier adapted to be utilized within a kitchen cabinet having upper and lower sections and a retractable hood in the lower section, said ventilator comprising a scroll housing disposed within the upper section of the cabinet and on a plane above the hood, a motor-operated blower in the scroll housing, a grease trap, an opening in the bottom of the upper section of the cabinet, the latter forming a shelf and providing a support for the scroll housing, said grease trap comprising an annular trough to contain the grease and including a central opening formed into a tube protruding through and spaced from the edges of the opening in the shelf to permit passage of smoke, grease-laden air and fumes from a stove, said scroll housing including an outlet for said fumes, smoke and grease-laden air to a flue.

5. A kitchen cabinet and air purifier as claimed in claim 4, both said scroll housing and said grease trap having flanges with apertures for bolts and wing nuts or the like, the shelf or bottom of the cabinet including apertures for the bolts and interposed between the flanges of the scroll housing and the grease trap, whereby the grease trap is removably held in operative position for displacement when necessary in removing the trapped grease.

6. A kitchen cabinet as claimed in claim 4, wherein the said bottom of the upper section of the cabinet providing the shelf has its opening in registry with the outer walls of the grease trap, whereby the grease collecting on the walls of the scroll housing will be deposited into the annular cavity of the grease trap.

BERNHARD SONNTAG.